March 1, 1955
J. L. TUCK
2,703,366
TIMING OF SHOCK WAVES
Filed Aug. 12, 1946
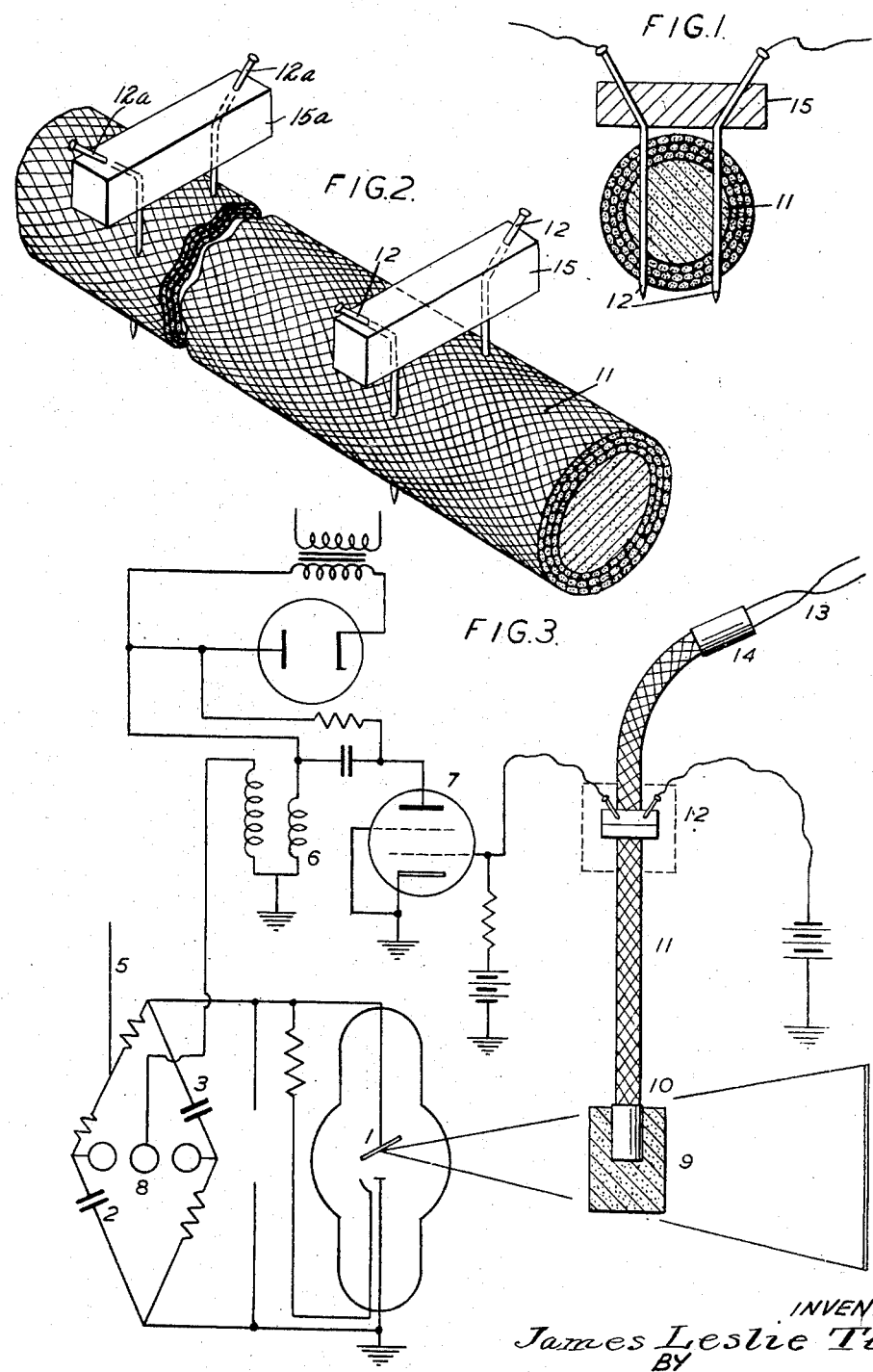
INVENTOR
James Leslie Tuck
BY
Glascock Downing Seebold
ATTORNEY United States Patent Office 2,703,366
Patented Mar. 1, 1955

2,703,366

TIMING OF SHOCK WAVES

James Leslie Tuck, Oxford, England, assignor to the Minister of Supply in Her Majesty's Government of the United Kingdom of Great Britain and Northern Ireland, London, England Application August 12, 1946, Serial No. 690,001

7 Claims. (Cl. 250—65)

This invention relates to means for ascertaining the instant of arrival of a shock wave such as is produced by an explosion, at a particular position in its path. The arrival of the wave may be simply recorded or it may be used for the initiation of some other operation which it may be desired to initiate at such an instant, for instance the photographic recording of the wave or of an associated phenomenon. The invention also includes within its scope the coordination of the timing of two operations at very short intervals of time and the controlling of operations of very short, determined duration. More complicated combinations of the above stated actions are also possible.

It is known that the wave front of a shock wave is at a high temperature and pressure, and this invention is based on these phenomena being accompanied by an increased electrical conductivity. The origin of the electrical conductivity may be ascribed to the following factors:

a. Thermal ionization of the medium.
b. Electrons produced in the chemical reaction, in the case of high explosives.
c. Thermionic emission from the electrodes.

According to the invention in its simplest and broadest aspect, a pair of spaced electrodes is interposed in the path of the wave, the electrodes constituting part of an electric circuit by which a desired action, such as recording, is set in train, a difference of potential being maintained on the electrodes of such value that a sufficient current flow occurs, when the path between the electrodes becomes conductive under the ionization produced by the arrival of the wave front. The invention has the advantage, as compared with schemes based on the interruption of an electrical circuit caused by rupture of a conductive element by the arrival of the wave, that in the latter case the ionization which is at its maximum precisely at the instant of the rupture is tending to maintain the circuit, i. e. it is opposing the effect being relied on, thus slowing down and making less clean-cut the breaking of the circuit. With the present invention, the circuit is made extremely rapidly because the establishment of conduction does not depend on the movement of macroscopic quantities of material, i. e. as in the closing of a switch, but only on the diffusion of electrons and ions between the electrodes. Before the arrival of the shock wave, the medium, for example air or high explosive, is an insulator, so that the resistance between the two electrodes, depending on their extent, will have a high value, say in the region of 1 to 1,000 megohms. At the instant the shock wave comes into contact with both electrodes, the resistance to a current flowing between the two electrodes falls to a smaller fraction of its previous value. The elements of the rest of the electrical circuit are arranged to be responsive to a change of this kind. This is of particular importance when time intervals of the order of a microsecond are in question.

If the invention is used for the purpose of recording the instant of arrival of the shock wave at a given point, the electrodes may be placed at the point and the circuit closed by them will actuate a recording device, the circuit and recording device used constituting a combination which has a known time delay which is either invariable or only varies within allowable limits. Instead of the circuit actuating a recording device, or in addition, it may be used to initiate some other operation. As an example the circuit may actuate a radio transmitter which sends a signal to some remote place, indicating the arrival of the detonation wave at the predetermined point.

To coordinate the timing of two operations at very short intervals of time, the electrodes may be inserted at a point in a charge which may be a detonating fuse consisting of a continuous thread of explosive, such as pentaerythritol tetranitrate, enclosed in a fabric tubular case, along which a detonation wave travels at known speed, the electrode circuit being arranged to initiate one operation, and the arrival of the wave at another point in the charge is arranged to initiate the second operation, the distance between the two points being made such that, having regard to any delay between the initiation and either actual operation, the desired time interval is obtained. Clearly precise coordination can only be obtained to the extents that the constancy of the speed of the wave and constancy of any delay times between initiation and operation (e. g. time delays of electrical circuits) can be relied on.

The second operation may also be initiated by a second pair of electrodes and associated circuit. Such an arrangement can be used for recording a very short interval of time. In that case, if both recording arrangements have the same time delays, the interval will be determined solely by the distance between the pairs of electrodes and the rate of travel of the wave. This method can also be used to determine the rate of travel of the wave if unknown, by recording simultaneously, for instance, photographically or by X-ray photography, the travel of a detonation wave in a charge of which the rate of travel is known so that this part of the record serves as a clock by which the interval is measured between the recorded instants of arrival of the wave of unknown speed at the respective pairs of electrodes.

Instead of actuating recording devices, the circuits associated with two pairs of electrodes spaced along the path of a wave may respectively start and stop some operation, thus enabling an operation of very short duration to be controlled.

The shock wave by which the circuit across the electrodes is closed may be travelling in a solid medium such as a detonating fuse or a high explosive, or it may be travelling in a gaseous medium such as air. Where timing of very short intervals is in question, the detonating fuse described above is a very convenient medium as it is found that the rate of travel of the detonation wave in such material is constant within very close limits, and is of an order which enables time intervals of very small duration to be conveniently dealt with. By way of example, in one type of detonating fuse, the rate of propagation is approximately 7 mm. per microsecond.

Neither the spacing of the electrodes nor the potential difference maintained across them is critical so long as on the one hand the field is of sufficient strength to ensure a large enough signal to cause the other circuit elements to function reliably, and on the other it is not so high as to cause premature conduction by leakage or breakdown of the medium between the electrodes. In a detonating fuse or a solid high explosive, the electrodes may be spaced 1 to 2 mm. and the impressed voltage may be from 10 to 450 volts. In a gas such as air, the spacing and voltage depend on the strength of the shock it is required to detect. For example, to detect the shock wave in air emanating from the surface of a charge of HE such as pentolite when the surface has the dimensions 10 cm. x 10 cm., and the detonation wave in the HE has struck this surface approximately normally, and the detection point in the air is 10 cm. away from the HE, spacing and voltage similar to the above would be adequate. The sensitivity of detection, in order to detect weaker shocks, can be increased, a. By increasing the area of the electrodes
b. By raising the applied voltage In the latter case, the voltage can be increased to the point before incipient sparking takes place.

A convenient mode of applying the circuit closing action of the shock wave to an operative electric circuit is through a thyratron. The grid of the thyratron is normally held at a negative potential sufficient to prevent anode current from passing and the electrode circuit is arranged when made to apply a positive potential to the grid. For the best results the plane of the electrodes should be disposed perpendicularly to the areas of wave front propagation.

The invention will be further described with reference to the accompanying drawings, in which Fig. 1 is a sectional view, and Fig. 2 a perspective view, of one practical form which the electrodes and their mounting may take, for use in conjunction with a detonating fuse, and Fig. 3 is a diagram showing one example of the use of the invention for the coordination of the timing of two operations at a very short interval of time.

In the arrangement shown in Figs. 1 and 2 the two electrodes are in the form of metal pins 12 carried in an insulating holder 15 which may conveniently be of poly-methylmethacrylate. The electrodes have pointed ends to facilitate their insertion into the fuse, indicated at 11, and they are spaced apart a distance rather less than the diameter of the fuse, so that when inserted, as shown, both penetrate the fuse and lie substantially in a plane normal to the length of the cord. The electrodes 12 can be used to detect the arrival of the shock wave caused by the firing of the fuse, at their location, or to initiate some operation at the time of their arrival, by including them in an electric circuit for instance as described below with reference to Figure 3. If it be desired to initiate a second operation at a very short interval after the first, a second pair of electrodes may be inserted in the fuse and a second circuit associated therewith, the distance between the two pairs of electrodes being determined by the required interval and the rate at which the wave travels along the cord. Such a further pair 12a with a holder 15a, is shown in Figure 2. Their construction is identical with 12, 15 and therefore requires no further description.

As a specific example of the use of the invention, its application to the photographic recording of an early stage of the detonation of a high explosive will now be described.

For this purpose, in view of the intense self-luminosity of the early stage of an explosion, the photograph is preferably taken by X-rays and to obtain a sufficiently short exposure a tube of the field emission type of Ehrke and Slack is suitable. Such a tube enables exposures of less than 0.5 microsecond to be obtained, as compared with exposures of 10 microseconds which are obtained with hot cathode tubes.

In the accompanying drawings, Fig. 3 is a simplified diagram showing the fundamentals of the circuit and of the timing and initiating arrangements.

Referring now to Fig. 3, the X-ray tube 1 of the field emission type is actuated by the discharge in series of two condensers 2, 3 which with their associated circuit elements constitute a Marx impulse generator. The condensers are charged in parallel by a high tension transformer and through a rectifying valve via lead 5. To operate the Marx circuit, the primary circuit of a small induction coil 6 is closed by means of a thyratron 7 and the resulting discharge across the small spark gap 8 allows the condensers 2, 3 to discharge in series through the tube 1. The grid of the thyratron is normally maintained at a negative potential sufficient to prevent current passing and is made conductive by the sudden application of a positive potential, the triggering impulse being derived from a circuit which is closed by the virtual joining of two electrodes by the arrival thereat of a detonation wave.

There is always a delay between the instant of triggering and the production of the X-ray flash. This delay is dependent upon the characteristics of the thyratron, the length of the grid leads, the induction coil and other elements of the circuit, and in one particular case amounted to 30 microseconds. With such intervals it is therefore not possible to obtain radiographs at very short intervals after firing the charge by using the shock wave of the charge itself to trigger the tube circuit and it is necessary to allow for the delay by triggering the tube circuit in advance of the actual detonation of the charge. Fig. 3 shows the means by which this may be done, in accordance with the invention.

The charge 9 is provided with a detonator 10 to which is joined a length 11 of detonating priming cord of length such that the time taken by the detonation wave to travel along its whole length (the rate of travel being known) is rather more than the delay required, having regard to the delay time of the circuit and the interval after initiation at which it is desired to take the photograph. At a distance from the detonator 10 which corresponds to the delay required, two electrodes 12 are inserted which are maintained at a suitable potential difference and are in the grid circuit of the thyratron 7. Leads 13 go from the electric detonator 14 on the cord 11 to a suitable supply circuit.

It will be understood that the X-ray tube and the photographic plate or film are mounted in proper relationship to one another on opposite sides of the charge and provided with adequate protection which is sufficiently transparent to X-rays.

Upon firing the electric detonator 14, a detonation wave is initiated in the cord 11 and after a very brief interval this reaches the electrodes 12 thereby closing the triggering circuit and setting in train the operation of the tube 1, the actual discharge through which will occur for example 30 microseconds later. The detonation wave continues down the fuse and initiates the detonation of the charge 9 at the predetermined interval before the X-ray flash.

To enable the actual intervals to be estimated, an additional branch of priming cord may be initiated either by the detonator 10 or the detonator 14, this branch being recorded on the radiograph. Thus the progress of the detonation wave down this branch will be recorded, and as the rate of travel of the wave is known, it may be used to provide a reliable clock giving an independent time measurement.

What I claim is:

1. Means for coordinating the timing of two operations involved a very short interval of time, comprising an explosive charge along which a detonation wave travels at a known rate, means for initiating an explosion in said charge, a pair of spaced electrodes inserted in said charge defining a path across the charge, an electric circuit associated with said electrodes for initiating one of said operations, means for maintaining a difference of potential across said electrodes of such value that a sufficient current flows in said circuit to initiate the operation when the path between the electrodes is rendered conductive by the arrival of a detonation wave thereat, and means for initiating the other operation located at another point of said charge and actuated by the arrival of a detonation wave thereat, the length of explosive charge between said path and said initiating means being such as to give the desired time interval between the operations having regard to any delay between the initiation and the actual operations.

2. Means as set forth in claim 1 wherein said explosive charge is a priming cord.

3. Means for coordinating the timing of two operations involving a very short interval of time, comprising an explosive charge along which a detonation wave travels at a known rate, means for initiating an explosion in said charge, two pairs of spaced electrodes inserted in said charge each pair defining a path across the charge, two electric circuits one for initiating each of said operations associated with the respective pairs of electrodes, and means for maintaining a difference of potential across each said pair of electrodes of such value that a sufficient current flows in the associated circuit to initiate the corresponding operation when the path between the electrodes of a pair is rendered conductive by the arrival of a detonation wave thereat, the length of explosive charge between said respective pairs of electrodes being such as to give the desired time interval between the operations having regard to any delay between the initiation and the actual operations.

4. Means as set forth in claim 3 wherein said explosive charge is a priming cord.

5. Means for coordinating the photographing of the detonation of an explosive charge with the initiation thereof so that the photographing is effected at a determined interval after the initiation, comprising an X-ray tube for illumination of the detonation, means for photographing the detonation when illuminated by X-rays, a priming charge along which a detonation wave travels at a known rate for initiating the detonation of said explosive charge, means for initiating a detonation wave in said priming charge, a pair of electrodes inserted in said priming charge defining a path across it between the point at which the detonation wave is initiated therein and said explosive charge, and an electric circuit associated with said electrodes for causing said X-ray tube to emit a flash discharge when the path between said electrodes is rendered conductive by the arrival thereat of a detonation wave travelling along said priming charge, the distance between said path and said explosive charge being such that having regard to the delay occurring between the arrival of the detonation wave at the electrodes and the actual emission of the flash, the flash is emitted and the photograph taken at the desired interval after the arrival of the detonation wave at the explosive charge and the consequent initiation of the detonation therein.

6. Means as set forth in claim 5 wherein said electric circuit includes an impulse circuit for supplying said X-ray tube, a thyratron controlling said impulse circuit, and a control circuit for said thyratron in which said electrodes are included.

7. Means as set forth in claim 5 wherein said priming charge is a priming cord and said electrodes consist of pins carried on an insulating holder.

References Cited in the file of this patent

UNITED STATES PATENTS

| | | |
|---|---|---|
| 1,898,626 | Healy | Feb. 21, 1933 |
| 2,112,736 | Cockrell | Mar. 29, 1938 |
| 2,206,927 | Turnbull et al. | July 9, 1940 |
| 2,382,981 | Edgerton | Aug. 21, 1945 |
| 2,395,902 | Nisewanger et al. | Mar. 5, 1946 |
| 2,418,523 | Neddermeyer et al. | Apr. 8, 1947 |